Feb. 24, 1942.                M. H. TUTTLE                2,274,223
                   METHOD OF SEPARATING WAX FROM OILS
                            Filed June 9, 1938
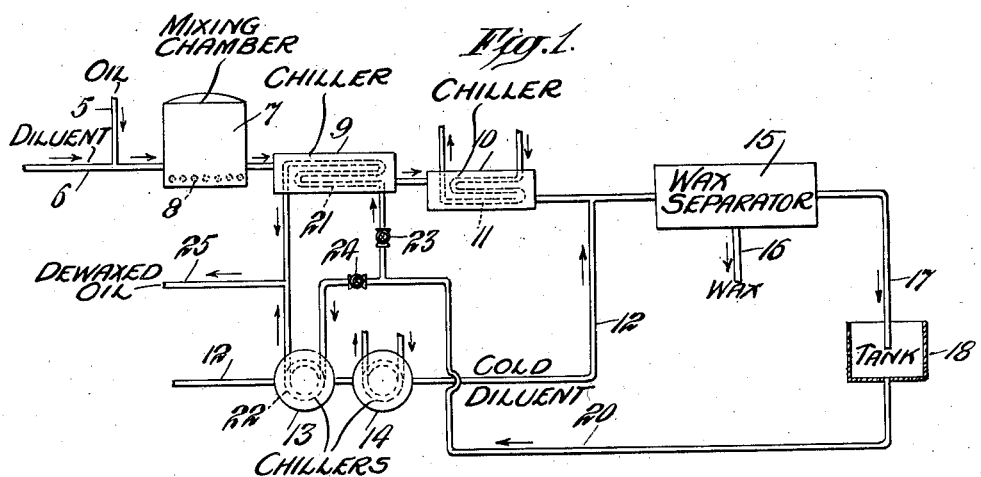
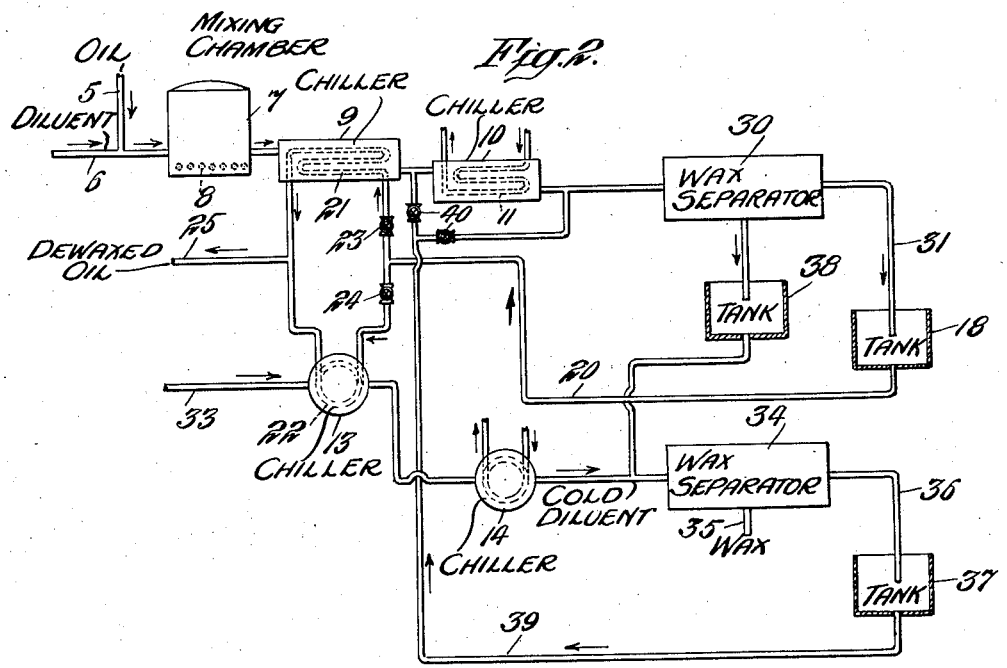
INVENTOR
MALCOLM H. TUTTLE
BY
Robert McC. Simonds
ATTORNEY Patented Feb. 24, 1942

2,274,223

UNITED STATES PATENT OFFICE 2,274,223

METHOD OF SEPARATING WAX FROM OILS

Malcolm H. Tuttle, New Rochelle, N. Y., assignor to Max B. Miller & Co., Inc., New York, N. Y., a corporation of Delaware Application June 9, 1938, Serial No. 212,631

3 Claims. (Cl. 196—18)

This invention relates to an improved method of separating wax from mineral oils.

It has long been the common practice to separate wax from mineral oil by warming the oil to melt the wax, mixing the warm oil with a suitable diluent, such as light naphtha, chilling the mixture, and separating the waxy material from the chilled mixture by filtering or centrifuging. The oil has been diluted before chilling with large volumes of diluent for the purpose of promoting separation of wax from the chilled mixture. The more difficult it was to separate the wax, the more diluent has been added to the initial mixture. When operating in this manner, the separation of wax from many mineral oils, either by centrifuging or by filtering, has proved extremely difficult, if not unfeasible.

It has been observed that when certain oil stocks, particularly long distillates or long residues, are chilled, the wax precipitates partly in "crystalline" form, and partly in a form which is variously referred to as "jelly-like," "malcrystalline," "amorphous" or "colloidal." Oils containing such mixtures of wax, especially when the latter type predominates, are exceptionally difficult to filter. Efforts to provide improved dewaxing methods have been numerous and varied. For example, it has been customary to chill the oil very slowly to cause the wax to precipitate, so far as possible, in a form which is filterable. It has also been proposed to segregate the two types of waxes so that the "crystalline" wax can be filtered, and so that the "colloidal" wax can be centrifuged. These proposals, although they have some advantages, also have apparent disadvantages.

I have discovered that by limiting the amount of diluent which is present during the initial stages of the chilling, or while most of the wax forms or congeals, the formation of objectionable colloidal wax is largely avoided even though the mixture is rapidly chilled. Only after the oil has been cooled to a temperature at which much of the wax is in condition for separation from the oil is additional diluent introduced. The resulting mixture is then chilled to final dewaxing temperature. I have found that it is thus feasible to largely avoid the formation of waxes which are difficult to filter or separate. Other features and advantages of the invention will be pointed out or become apparent.

In order to further explain the nature of my invention, I set forth certain illustrative examples, reference being had to the accompanying drawing wherein:

Fig. 1 is a diagrammatic flow sheet illustrating one method of carrying out my method; and Fig. 2 is a modification of Fig. 1, including additional features of the invention.

In accordance with Fig. 1, the oil is introduced through pipe 5 and the diluent through pipe 6 into a suitable chamber 7 which is preferably provided with a heating coil 8 for warming the mixture of diluent and oil in order to melt the normally solid wax. The volume of diluent which is mixed with the oil in this manner is so limited that the formation of colloidal or difficultly filterable wax during the subsequent chilling is substantially avoided. The warm mixture of oil and diluent is then passed to a scraper type heat exchanger 9 in which the mixture is cooled. This heat exchanger may be of any suitable or known construction. After the mixture has been cooled by heat exchange it is passed to a chilling chamber 10 which is provided with a refrigerating coil 11 for ammonia or other refrigerant. This chiller may also include scrapers, as will be understood by those familiar with the art.

The additional amount of diluent which is added to the oil may be supplied through line 12, after having been separately chilled, for instance in heat exchanger 13 and refrigeration chamber 14. As indicated in the example hereinafter given, the cold diluent is added to the partially chilled oil before the second stage of the chilling. The amount of diluent which is added through line 12 is such that the oil is sufficiently diluted, as will be understood by those skilled in the art, for advantageous filtering or centrifuging. Ordinarily two to three volumes of diluent per volume of oil may be added at this stage in the operations.

The highly diluted oil then passes through a filter 15 or other suitable device for separating the wax from the oil. The wax, together with some oil and diluent, may be withdrawn as indicated at 16. The cold dewaxed oil and diluent may be withdrawn through pipe 17 into a tank 18, and thence through pipe 20 and coil 21 of heat exchanger 9; or a portion of this mixture may be passed through the coil 22 of heat exchanger 13, under the control of valves 23 and 24. The dewaxed oil and diluent may be led through line 25 to an evaporator (not shown) for recovering the diluent from the oil.

I have found that good results are obtainable when the amount of diluent which is added to the oil prior to chilling is merely sufficient to make the oil readily pumpable, and insufficient to enable disperse formation of fractionally precipitated wax. I have found that good results are obtainable with from little or no diluent to about one-half volume of diluent per volume of oil during chilling; that when treating residues good results are obtainable with about one volume of diluent per volume of oil during chilling.

Although I do not wish to be limited to any particular theory of operation, I believe that the formation of objectionable colloidal or jelly-like wax has been due to the use of such large amounts of diluent that the wax forms substantially without space limitation, or fractionally precipitates. With the foregoing in mind, those skilled in the art will readily be able to select a properly limited volume of diluent for the treatment of any particular stock.

I have found that the oil should be chilled to 25° F., or below, before the additional diluent is added. Although a considerable amount of wax has already formed when the temperature reaches 40° F., the best results are obtainable by chilling to a much lower temperature before introducing the additional amount of diluent. In most cases, I prefer to chill the mixture of oil and limited amount of diluent to approximately 0° F., or below, before adding the additional diluent.

In Fig. 2 there is shown a system for two-stage separation of the wax from the oil, by which an increased yield of wax-free oil is obtained. After the mixture of oil and wax has been chilled and further diluted as described in connection with Fig. 1, it is sent to a filter 30 which separates the wax, together with some oil and diluent, from the balance of the oil. The recovered oil and diluent is withdrawn from the filter through pipe 31 and may follow the same path as described in connection with Fig. 1.

The wax, together with some oil and diluent, is collected in tank 32 and then mixed with diluent which is chilled as described above and delivered through pipe 33. The resulting mixture passes to the second-stage filter 34, where it is separated into wax, together with some diluent, withdrawn as indicated at 35, and a mixture of oil and diluent, withdrawn through pipe 36, into tank 37. This oil and diluent in tank 37 is returned to the first stage of the system through line 39, and is preferably introduced to the mixture of oil and diluent in the first stage at a point where the temperature of the two mixtures is approximately the same. This may be readily controlled by means of valves 40 so that the recycled oil can be introduced before the final refrigerating step in the first stage. The mixture from the second stage may be separately chilled before introducing it to the first stage. It will be understood that centrifuges can be employed in place of filters. When centrifuges are used, hot water is added to assist the discharge of wax from the centrifuges. In two-stage operation, the hot water which is used to assist the discharge of wax from the first-stage centrifuge is removed from the melted wax, and the dehydrated wax is then chilled in a limited amount of diluent, for the reasons previously described. Thereafter, additional cold diluent is added prior to the second-stage centrifuging.

The present method is especially adapted for dewaxing oils containing upwards of 15 to 20% of waxy material. As indicative of the improved results which are obtainable according to the present invention, I give examples of comparative tests.

One volume of a Kettleman Hills wax-bearing stock was mixed with 2.88 volumes of hexane and was chilled, according to the prior plant practice, at a rate of 2½° per hour, from 110° F. to 0° F. and then at 3½° per hour from 0° F. to −38° F. The mixture was then centrifuged and it was found that the yield of oil was 48.4 per cent. by volume and the pour-point of this oil was 50° F. When a portion of the same crude was treated with the same diluent using 1 volume of diluent to 1 volume of stock during the chilling to 0° F., and then adding 2 volumes of hexane which had been separately chilled, and chilling the mixture to −38° F., the yield of oil was 57.5 per cent. and its pour-point was 5° F. Thus, although much more wax was removed from the oil according to the method of the present invention, as shown by the reduced pour-point, the yield of oil was much larger.

The Kettleman Hills stock prior to dewaxing contains about 27% of wax. The specified 1 to 1 dilution of this stock during the initial stage of the chilling is merely sufficient to permit pumping of the oil through heat exchangers. When the stock thus diluted is chilled to the final dewaxing temperature mentioned it is solid. It will be understood that the 1 to 1 dilution is based upon the particular stock mentioned. The temperature of the cold diluent which is added to the partially chilled mixture prior to the second stage of the chilling should be approximately the same as the temperature of the mixture to which it is added.

Another advantage of the present invention lies in the fact that the chilling can be accomplished extremely rapidly. For example, I have chilled one volume of this same stock mixed with an equal volume of hexane from 120° F. to −45° F. in approximately 32 minutes. This is at a rate of about 5° F. per minute. Although this chilling was at a rate approximately one hundred times the rate of chilling ordinarily employed when using light naphtha according to the prior practice, I was able to filter the oil rapidly and obtained a high yield of oil of low pour-point. In other comparative tests, using 3 volumes of acetone-benzol mixture (1 part acetone to 2 parts benzol) and 1 volume of oil during the chilling and separating, I have found that the filter cake became so impervious that the flow of filtrate ceased long before the oil was completely drained from the wax. When I employed this diluent according to the present invention, there was no difficulty in obtaining a complete filtration. Moreover, the time required for filtration was only a fraction of the time required according to prior practice.

When the term amorphous is used in the present specification and claims it intends waxy material having the characteristics of difficultly filterable waxes which are often referred to as "jelly-like," "mal-crystalline," or colloidal; in other words, the term is not used in a strict technical sense.

Thus the present invention provides for dewaxing oils without the formation of objectionable colloidal wax which is difficult to separate from the oil, and which greatly reduces the filter rates. It results in an increased yield of oil having a low pour-point, or in other words containing a minimum amount of wax for a given chilling temperature. The present method also enables the oil to be chilled more rapidly than would otherwise be possible, so that less equipment is needed in order to treat a given volume of oil. This is particularly important because chillers provided with scrapers for removing the wax from the walls thereof are expensive and power-consuming. Thus, the use of a limited amount of diluent during the cooling step not only results in the precipitation of the wax in a form which is readily separated from the oil, either by filtering or centrifuging, but also results in an increased through-put in a plant of given size.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. The method of dewaxing petroleum oil containing upwards of 15 per cent mixed waxes of the character described which are difficult to separate from the oil, which comprises warming and mixing the oil with a volume of normally liquid diluent which is not substantially greater than the volume of oil and which is sufficient to render the oil pumpable during the initial stages of the chilling, passing the thus diluted mixture through a heat exchange chiller to chill the mixture to a temperature sufficiently low to cause most of the wax to precipitate but substantially above final dewaxing temperature and not so low as to render the mixture non-pumpable, thereafter adding to the partially chilled mixture a further quantity of normally liquid diluent sufficient to maintain the mixture fluid at final dewaxing temperature, said further quantity of diluent being as cold as said mixture and above final dewaxing temperature, therafter further chilling the resulting mixture to final dewaxing temperature substantially below the first-named temperature solely by passing it through a heat exchange chiller, and thereupon separating the precipitated wax from the thus chilled mixture.

2. The method as claimed in claim 1 wherein the normally liquid diluent is naphtha.

3. The method as claimed in claim 1 wherein the normally liquid diluent is an acetone-benzol mixture.

MALCOLM H. TUTTLE.

CERTIFICATE OF CORRECTION.

Patent No. 2,274,223.  February 24, 1942.

MALCOLM H. TUTTLE.

It is hereby certified that error appears in the printed specification of the above numbered patent requiring correction as follows: Page 2, second column, line 60, strike out the word "amorphous" and insert instead --colloidal--; line 64, strike out "colloidal" and insert instead --"amorphous"--; page 3, first column, line 24, claim 1, before "mixed" insert --of--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.